United States Patent [19]
Hazenbroek et al.

[11] Patent Number: 5,875,738
[45] Date of Patent: Mar. 2, 1999

[54] TILTABLE POULTRY SHACKLE

[75] Inventors: Jacobus E. Hazenbroek, Klaaswaal; Dirk Cornelis Stooker, AL's-Gravendeel, both of Netherlands

[73] Assignee: Ststemate Holland, B.V., Numansdorp, Netherlands

[21] Appl. No.: 968,052

[22] Filed: Nov. 12, 1997

[51] Int. Cl.$^6$ ............................. A22C 21/00; A01K 37/00
[52] U.S. Cl. ............................................. 119/716; 452/188
[58] Field of Search ........................... 119/716; 452/187, 452/188

[56] References Cited

U.S. PATENT DOCUMENTS

| | | | |
|---|---|---|---|
| 3,132,373 | 5/1964 | Altenpohl, Jr. | 17/44.1 |
| 3,263,270 | 8/1966 | Crawford et al. | 17/44.1 |
| 3,563,363 | 2/1971 | Harben | 198/177 |
| 3,781,946 | 1/1974 | Altenpohl | 17/44.1 |

*Primary Examiner*—Thomas Price
*Attorney, Agent, or Firm*—Thomas, Kayden, Horstemeyer & Risley

[57] ABSTRACT

The poultry shackle assembly (10) includes an upper hanger rod (11) and a lower carcass hanger (12). The legs (44 and 45) of a poultry carcass (46) are inserted into the leg recesses (42 and 43) of the carcass hanger. Guide rods (66, 67 and 68) tilt the carcass hanger (12) and the carcass (46) to an attitude suitable for visual inspection of the visceral cavity (49) of the carcass (46). Lock collar (48) moves downwardly along the hanger rod (11) until it is received in the lock recesses (58) of the clevis plates (34 and 35) of clevis (32), thereby holding the carcass (46) in the desired attitude for visual inspection. Later, the lock collar (48) is lifted by a guide rod (67) out of locking engagement with respect to the clevis (32), to permit the carcass (46) to reassume its vertical orientation for further advancement along the processing line.

10 Claims, 2 Drawing Sheets

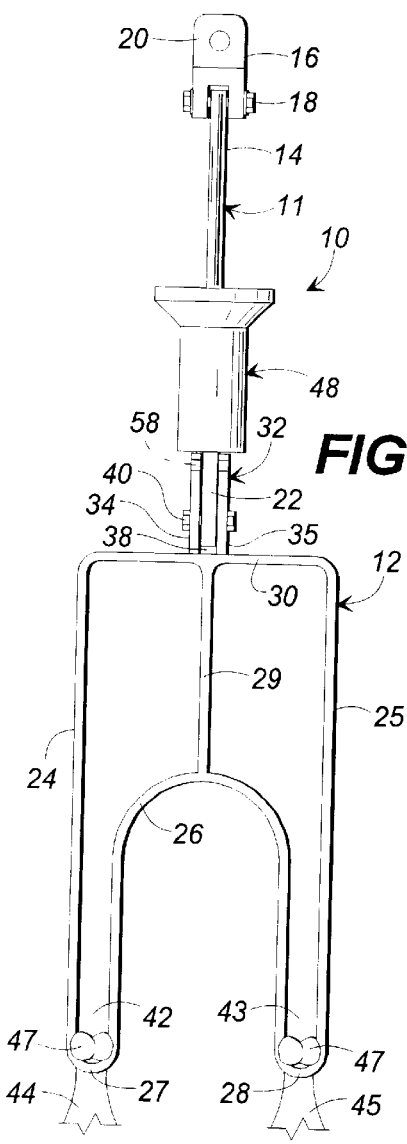
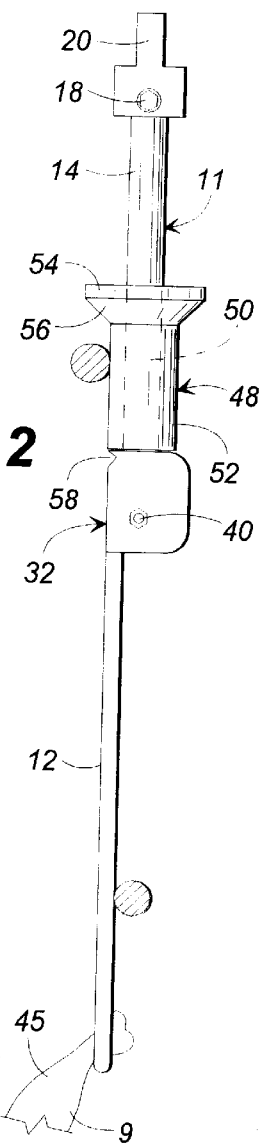
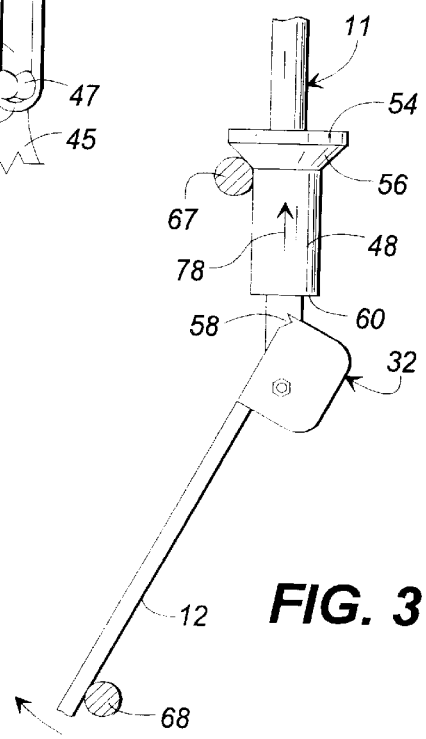
FIG. 1
FIG. 2
FIG. 3

TILTABLE POULTRY SHACKLE

FIELD OF THE INVENTION

This invention relates to shackles for transporting poultry carcasses along a processing line wherein the carcasses are eviscerated or otherwise treated, and the carcasses are visually inspected for disease, improper evisceration, contamination or other blemishes.

BACKGROUND OF THE INVENTION

In the processing of poultry, such as chickens, which are to be sold to the public, typically the processing steps such as evisceration of the carcasses and the cut up of the carcasses are performed automatically on a poultry processing line, whereby the birds are suspended by their legs and transported in series through a plurality of processing functions.

In order to eviscerate poultry carcasses, the typical process steps include decapitating the carcasses, opening the vent of the carcasses, and removing the viscera from the vent opening. Typically, each carcass is suspended by its legs from a shackle that is suspended from and moved along an overhead conveyor rail, with the birds being moved by the shackles in closely spaced series through the evisceration station. The eviscerator extends a spoon or loop device into the opened vent, downwardly into the visceral cavity and then scoops the viscera upwardly from the bird. Once the birds have been mechanically eviscerated, the birds and their drawn viscera must be inspected visually for imperfections, such as disease, incomplete evisceration, contamination, etc. While the birds are still suspended by their shackles, they are transported past an inspector who is trained to look for the blemishes. If a bird is not perfect, the inspector removes the bird from the processing line.

One of the problems involved with visually inspecting poultry carcasses as they move rapidly along a processing line is that the inspector has a difficult time inspecting the visceral cavities of the birds. The visceral cavities of the birds face upwardly as they move along the processing line, and the inspector usually is spaced laterally from the processing line. Also, it is desirable to move the birds as rapidly as possible along the processing line so as to maximize the production of the processing system.

Thus, it would be desirable to have a means whereby each poultry carcass is tilted to an attitude that exposes its visceral cavity in a lateral direction with respect to the processing line so that a poultry inspector can inspect the visceral cavity of each bird.

SUMMARY OF THE INVENTION

Briefly described, the present invention comprises a tiltable poultry shackle for transporting a poultry carcass, such as the carcass of a chicken, along a poultry processing line, with the carcass suspended by its legs. The shackle includes a hanger rod which is connected at its first or upper end to a trolley of a suspended rail and trolley transport line. A carcass hanger has its upper or first end connected to the lower end of the hanger rod, and it includes at its lower or second end leg-receiving recesses for receiving the legs of a poultry carcass, for suspending the poultry carcass for movement along the processing line.

A clevis is mounted to the upper end of the carcass hanger and is tiltably connected to the lower end of the hanger rod, for tilting the carcass hanger and the carcass suspended from the carcass hanger with respect to the hanger rod. A lock collar is slidably mounted to the hanger rod and is movable along the length of the hanger rod into and out of engagement with the clevis of the carcass hanger. The clevis of the carcass hanger has a recess or notch which is engageable by the lock collar when the carcass hanger has been tilted to a predetermined tilt angle with respect to the hanger rod. Thus, the clevis and the lock collar function as a lock means to hold the hanger rod and its bird at a tilted angle with respect to the hanger rod whereby the visceral cavity of the bird is exposed laterally of the processing line and can be inspected by a person located adjacent the processing line.

A plurality of guide rods are located along the path of the hanger rod and carcass hanger for controlling the lateral movements of the hanger rod and for tilting the carcass hanger with respect to the hanger rod, and for raising the lock collar out of engagement with the clevis, thereby unlocking the carcass hanger to allow it to respond to gravity and swing back to a vertically oriented attitude.

Thus, it is an object of this invention to provide a shackle for transporting an eviscerated poultry carcass suspended by its legs along a processing line, and for tilting the poultry carcass to a predetermined angle so as to laterally expose the eviscerated cavity of the bird.

Another object of this invention is to provide an improved shackle for transporting poultry carcasses along a processing path, with the carcasses being suspended by their legs, with the shackle having a lower carcass hanger that is freely pivoted with respect to an upper hanger rod, but which can be expediently locked into a tilted position and released from the tilted position for the purpose of briefly orienting the eviscerated cavity of the carcass in a lateral attitude for inspection, and which returns the carcass to an upright attitude for further processing.

Other objects, features and advantages of the present invention will become apparent upon reading the following specification, when taken in conjunction with the accompanying drawings.

BRIEF DESCRIPTION OF THE DRAWINGS

FIG. 1 is a rear elevational view of the shackle assembly, with the front view being substantially identical thereto.

FIG. 2 is a side elevational view of the shackle assembly.

FIG. 3 is a partial view of the upper portion of the carcass hanger and the lower portion of the hanger rod, showing the clevis and lock collar, with guide rods controlling the angle of the tilt of the carcass hanger with respect to the hanger rod.

DETAILED DESCRIPTION

Figure 4:
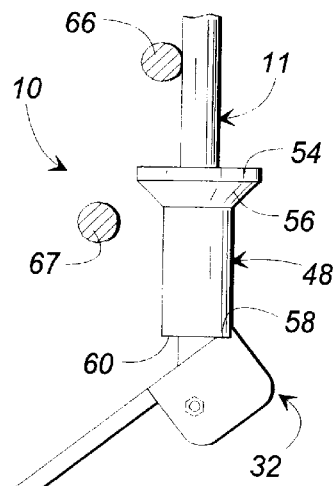
FIG. 4 is a side view of the shackle assembly, showing the lower portion of the hanger rod and the carcass hanger, with the carcass hanger locked at a predetermined angle with respect to the hanger rod, and with guide rods controlling the attitude of the carcass hanger as it assumes its locked position.
Figure 4:
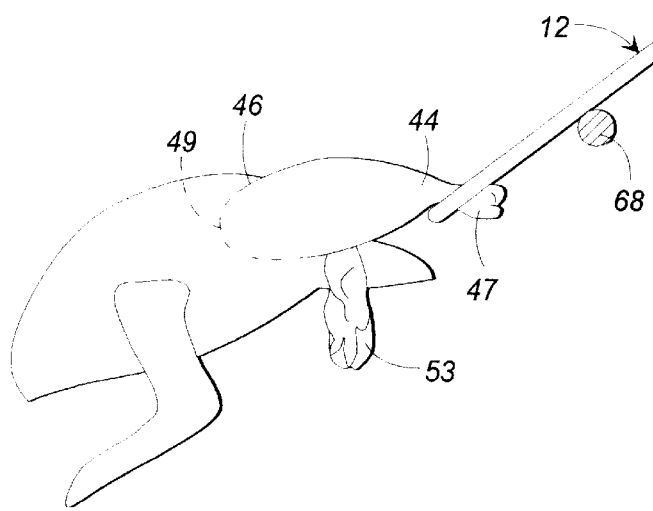

Referring now in more detail to the drawings, in which like numerals indicate like parts throughout the several views, FIG. 1 illustrates the poultry shackle assembly 10 which includes a hanger rod 11 and a carcass hanger 12. The upper or first end 14 of the hanger rod 11 is pivotally connected to the connector bracket 16 by bolt 18 extending through aligned openings (not shown) of the bracket and hanger rod, and the upper tab 20 of the bracket attaches to a trolley of an overhead conveyor rail (not shown). The lower or second end 22 of the hanger rod 14 is connected to carcass hanger 12.

Carcass hanger 12 includes side arms 24 and 25, arch-shaped inner rod 26 which is connected at its lower ends to one leg of each of the U-shaped bends 27 and 28, with the other leg of the bends being connected to the lower ends of the side arms 24 and 25, respectively. Vertical stabilizer bar 29 is connected at its lower end to the mid point of arch-shaped inner rod 26, and cross bar 30 is connected at its opposite ends to the upper ends of the side arms 24 and 25, and intermediate its ends to the upper end of vertical stabilizer bar 29. Clevis 32 is rigidly mounted to the mid point of cross bar 30 and includes a pair of clevis plates 34 and 35 that are spaced from each other and are parallel to each other to form a clevis gap 38. Bolt 40 extends through aligned openings (not shown) of the lower end 22 of the hanger rod 11 and through the clevis plates 34 and 35, thereby pivotally connecting the upper portion of the carcass hanger 12 from the lower portion of the hanger rod 11.

The U-shaped bends 27 and 28 formed at the lower ends of the side arms 24 and 25 and arch-shaped inner rod 26 form recesses 42 and 43 for receiving the legs 44 and 45, respectively of a poultry carcass 46.

Lock collar 48 is slidably received on the elongated hanger rod 11, with its central opening 50 (FIG. 2) surrounding the hanger rod. The central opening 50 is cylindrical so that the lock collar can rotate about the hanger rod. The lock collar includes a cylindrical body portion 52 and an upper outwardly protruding flange 54. A sloped annular shoulder surface 56 of the flange 54 extends between the enlarged portion of the flange 54 and the smaller cylindrical surface 52 of the lock collar.

Clevis 32 at the upper end of carcass hanger 12 has lock recesses 58 formed in an upper portion thereof, in the same place on both clevis plates, so that the lock recesses 58 straddle the lower end 22 of the hanger rod 11. The lock recesses face laterally when the carcass hanger 12 extends downwardly under the influence of gravity below the hanger rod.

Figure 5:
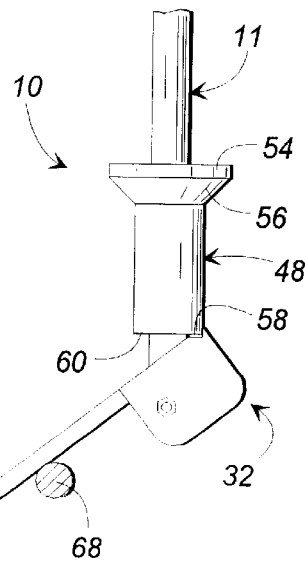
FIG. 5 is a side view of the shackle assembly, showing the lower portion of the hanger rod and the carcass hanger, similar to FIG. 4, but showing how the movement of the shackle assembly can be controlled with a single guide rod after the carcass hanger has been locked with respect to the hanger rod.
Figure 5:
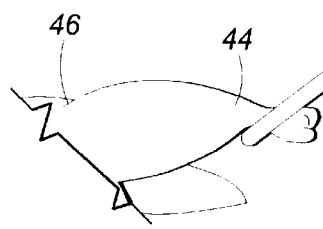

When the carcass hanger 12 is tilted as indicated in FIGS. 3–5, the lock recesses 58 move beneath the lock collar 48, and when the carcass hanger achieves a predetermined angle with respect to the hanger rod 11, the lock recesses will be in alignment with the lower edge 60 of the lock collar 48 so that the lock collar 48 functions as a lock member and will drop under the influence of gravity into engagement with the lock recesses 58. Thus, the recesses 58 function as lock engagement surfaces and lock against the lock collar to prevent the carcass hanger 12 from returning to its vertical position.

As illustrated in FIGS. 3, 4 and 5, guide rods 66, 67 and 68 are used to control the movements of the hanger rod 11, carcass hanger 12, and lock collar 48.

As shown in FIG. 4, the poultry carcass 46 is suspended from the carcass hanger 12 of the shackle assembly 10 by inserting the legs 44 and 45 of the carcass from in front of the shackle into the recesses 42 and 43 (FIG. 1). The poultry shackle assembly 10 is oriented so that its lock recesses 58 face the bird as the bird is being hung in the hanger 12, so that the legs 44 and 45 are thrust between the arch-shaped inner rod 26 and the side arms 24 and 25 of the carcass hanger 12, and then are moved downwardly so that the enlarged knuckles 47 of the leg are placed on the back side of the poultry shackle assembly 10, with the major portion of the legs 44 and 45 and the remaining portion of the carcass 46 extending forwardly of the shackle assembly.

As the shackle assembly advances along the poultry processing path, the carcass hanger 12 will be engaged by a stationary guide rod 68 which begins to tilt the carcass hanger 12 and the poultry carcass 46 forwardly of the poultry shackle assembly 10. Since the carcass 46 and carcass hanger 12 weigh substantially more than the hanger rod 11, the tilting movement of the hanger rod must be restrained, as by a similar guide rod 66, so as to keep the hanger rod 11 in a substantially vertical attitude. This is illustrated best in FIG. 3.

As the carcass hanger and poultry carcass 46 begin to tilt, the orientation of the legs 44 and 45 of the carcass 46 and the carcass hanger 12 causes the bird to tilt in unison with the carcass hanger, instead of being allowed by gravity to assume a vertical attitude. The knuckles 47 being positioned behind the carcass hanger maintain the legs 44 and 45 of the carcasses in a substantially fixed relationship with respect to the carcass hanger 12 during the tilting function, so that the legs are projected laterally instead of being allowed to be suspended downwardly. Further, since the recesses 42 and 43 which receive the legs of the carcass are spread apart, there is no visual obstruction between the visceral cavity 76 of the bird and the inspector who is located behind the poultry shackle assembly 10.

As the carcass hanger 12 continues along the processing line, the guide rod 68 continues to lift the carcass hanger so as to further rotate the lock recesses 58 to an upwardly facing position. In the meantime, a guide rod 67 engages the sloped annular surface 56 of the lock collar 48, to lift the lock collar upwardly as indicated by direction arrow 78 (FIG. 3), so as to not impede the tilting function. Also, guide rod 67 resists the tilting movement of hanger rod 11.

As illustrated in FIG. 4, when the carcass hanger 12 achieves a predetermined tilt angle with respect to the hanger rod 11, the lock recesses 58 will have rotated through a substantially upwardly facing attitude so that the lower edge 60 of the lock collar 48 can be received in the lock recesses 58. At this point, the guide rod 67 will be in a position withdrawn from the lock collar 48, so that the lock collar can move by gravity into the lock recesses 58 of the clevis 32. This locks the carcass hanger 12 against a return motion, so that it maintains its tilt angle with respect to the hanger rod 11. This orients the carcass 46 and its visceral cavity 49 at an optimum angle with respect to the inspector who sits across, behind the poultry shackle assembly 10, so that the visceral cavity 49 is oriented for visual inspection.

As the poultry shackle assembly 10 continues its advancement along the processing line, the guide rod 68 is angled so that it engages the carcass hanger 12 closer to the clevis 32 so that it is out of the way for visual inspection of the visceral cavity 49 of the poultry carcass, yet holds the hanger rod 11 and carcass hanger 12 in the desired attitudes, while these parts remain locked.

Typically, the carcass hanger and its carcass will be tilted when being advanced just beyond the step of drawing the viscera 53 from the cavity of the bird, so that the viscera 53 has not been completely separated from the bird but is suspended from the bird. This enables the inspector to inspect the drawn viscera of each bird and to simultaneously inspect the cavity of each bird.

When it is time to release the tilt of the carcass hanger with respect to the hanger rod, a guide rod, similar to guide rod 67 of FIG. 3, is utilized to engage the sloped annular surface 56 of the lock collar 48, lifting the lock collar in the direction as indicated by arrow 78, to remove the lower edge 60 of the lock collar from the lock recesses 58 of the clevis plates 34 and 35. This allows gravity to return the carcass hanger 12 to a vertical attitude. This return movement can be stabilized by guide rods, such as guide rods 67 and 68 of FIG. 3.

Thus, it can be seen from the foregoing description that the clevis 32 with the lock recesses 58 formed in the clevis plates 34 and 35, together with the lock collar 48 function as a lock means for holding the carcass hanger 12 and the carcass 46 in a predetermined tilted attitude with respect to the hanger rod 11. Further, the flange 54 and sloped annular surface 56 of the lock collar form a protrusion of the lock means against which the guide rod 67 can function to lift the lock collar 48 out of engagement with respect to the clevis 32.

Although a preferred embodiment of the invention has been disclosed in detail herein, it will be obvious to those skilled in the art that variations and modifications of the disclosed embodiment can be made without departing from the spirit and scope of the invention as set forth in the following claims.

We claim:

1. A shackle for transporting a poultry carcass suspended by its legs along a processing line and for tilting the carcass to a position for visual inspection of the visceral cavity of the carcass as the carcass is advanced along the processing line, comprising:

a hanger rod having a first end adapted to be connected to a trolley of a suspended rail and trolley transport line, and a second end;

a carcass hanger having a first end and a second end with said second end including leg receiving recesses for receiving the legs of a poultry carcass and suspending the poultry carcass for movement along the processing line;

a clevis mounted to the first end of said carcass hanger and tiltably connected to said second end of said hanger rod for tilting said carcass hanger and a poultry carcass suspended therefrom with respect to said hanger rod for visual inspection of the visceral cavity of the carcass;

a lock member mounted to said hanger rod and movable with respect to said hanger rod into and out of locking engagement with said clevis of said carcass hanger to hold said carcass hanger in tilted relationship with respect to said hanger rod; and said lock member including a protrusion for engagement and moving said lock member out of locking engagement with said clevis.

2. The shackle of claim 1, wherein:

said hanger rod is elongated;

said lock member comprising a lock collar slidable along said hanger rod into and out of engagement with said clevis; and said clevis including a notch for receiving said lock collar when said carcass hanger is tilted to a predetermined angle with respect to said hanger rod to lock said carcass hanger and a carcass suspended thereby in a tilted relationship with respect to said hanger rod.

3. The shackle of claim 2, wherein:

said protrusion of said lock member comprises a flange extending about said lock collar.

4. The shackle of claim 1, and further including:

stationary shackle guide means positioned along the processing line of said hanger rod and said carcass hanger for tilting said carcass hanger with respect to said hanger rod; and guide means positioned along the processing line of said hanger rod and said carcass hanger for moving said lock member away from said clevis to unlock said lock member from said clevis.

5. A shackle for transporting an eviscerated poultry carcass suspended by its legs along a processing line and for tilting the carcass to a position for visual inspection as the carcass is advanced along the processing line, comprising:

a hanger rod having an upper end for connection to a trolley of a suspended rail and trolley transport line and a lower end;

a carcass hanger having an upper end and a lower end with said lower end including leg receiving recesses for receiving the legs of a poultry carcass and suspending the poultry carcass for movement along the processing line;

said carcass hanger being tiltably connected at its upper end to said lower end of said hanger rod for tilting said carcass hanger and a carcass suspended therefrom with respect to said hanger rod for visual inspection of the visceral cavity of the carcass;

said carcass hanger including at its upper end a lock engagement surface; and a lock member mounted to said hanger rod and movable with respect to said hanger rod into and out of locking engagement with said lock engagement surface of said carcass hanger to hold said carcass hanger in tilted relationship with respect to said hanger rod.

6. The shackle of claim 5, wherein:

said hanger rod is elongated;

said lock member comprises a lock collar slidable along said hanger rod into and out of engagement with said lock engagement surface; and said lock engagement surface including a notch for receiving said lock collar when said carcass hanger is tilted to a predetermined angle with respect to said hanger rod to lock said carcass hanger and a carcass suspended thereby in a tilted relationship with respect to said hanger rod.

7. The shackle of claim 6, wherein:

said lock collar includes a flange extending about said lock collar for engagement by a lifting means to move said lock collar out of engagement with said notch.

8. The shackle of claim 5, and further including:

stationery shackle guide means positioned along the processing line of said hanger rod and said carcass hanger for tilting said carcass hanger with respect to said hanger rod; and guide means positioned along the processing line of said hanger rod and said carcass hanger for moving said lock member away from said lock engagement surface to unlock said lock member from said lock engagement surface.

9. A method of inspecting the previously eviscerated visceral cavities of poultry carcasses comprising:

suspending carcasses by their legs from carcass hangers of poultry shackle assemblies each having a carcass hanger tiltably suspended from a hanger rod by inserting the knuckles of the legs through the front leg-receiving recesses of each carcass hanger;

advancing the poultry shackle assemblies and their carcasses in series along a processing line;

in response to advancing the poultry shackle assemblies along the processing line tilting the carcass hanger and carcass of each poultry shackle assembly forwardly with respect to the hanger rod to tilt the legs of the carcass laterally;

as the carcass hanger is tilted, restraining the tilting of the hanger rod;

while the carcass hanger and carcass of each shackle assembly are tilted, visually inspecting the visceral cavity of the carcass; and after the visceral cavity has been inspected returning the carcass hanger to a vertical attitude.

10. The method of claim 9 and further including the step of locking the carcass hanger with respect to the hanger rod in response to the carcass hanger reaching a predetermined angle of tilt with respect to the hanger rod.

* * * * *